United States Patent
Costin

(10) Patent No.: US 6,858,815 B1
(45) Date of Patent: Feb. 22, 2005

(54) DENIM DESIGNS FROM LASER SCRIBING

(75) Inventor: Darryl Costin, Perrysburg, OH (US)

(73) Assignee: Technolines LLC

( * ) Notice: Subject to any disclaimer, the term of this patent is extended or adjusted under 35 U.S.C. 154(b) by 79 days.

(21) Appl. No.: 10/319,163

(22) Filed: Dec. 14, 2002

Related U.S. Application Data

(63) Continuation of application No. 09/408,131, filed on Sep. 29, 1999, now Pat. No. 6,495,237.
(60) Provisional application No. 60/102,363, filed on Sep. 29, 1998.

(51) Int. Cl.[7] .............................................. B23K 26/00
(52) U.S. Cl. ............................. 219/121.69; 219/121.85
(58) Field of Search ....................... 219/121.69, 121.85, 219/121.68, 121.6; 8/115.51

(56) References Cited

U.S. PATENT DOCUMENTS

| | | | | |
|---|---|---|---|---|
| 3,445,234 A | * | 5/1969 | Cescon et al. | 430/332 |
| 4,845,789 A | | 7/1989 | Morton et al. | |
| 5,185,511 A | * | 2/1993 | Yabu | 219/121.78 |
| 5,567,207 A | * | 10/1996 | Lockman et al. | 8/444 |
| 5,916,461 A | | 6/1999 | Costin et al. | |
| 5,990,444 A | | 11/1999 | Costin | |
| 6,002,099 A | * | 12/1999 | Martin et al. | 219/121.69 |
| 6,140,602 A | * | 10/2000 | Costin | 219/121.69 |
| 6,252,196 B1 | | 6/2001 | Costin et al. | |
| 6,685,868 B2 | * | 2/2004 | Costin | 264/400 |

* cited by examiner

Primary Examiner—M. Alexandra Elve
(74) Attorney, Agent, or Firm—Scott C. Harris, Esq.

(57) ABSTRACT

A number of new laser patterns are defined by laser scribing the material. This produces new laser patterns which have not previously been known.

17 Claims, 10 Drawing Sheets

DENIM DESIGNS FROM LASER SCRIBING

The present application is a continuation of U.S. application Ser. No. 09/408,131, filed Sep. 29, 1999, now U.S. Pat. No. 6,495,237. It also claims benefit from Provisional Application 60/102,363 filed Sep. 29, 1998.

BACKGROUND

A major driving force for growth of the denim industry is the need for new innovation and fashion. However, the current technology of producing and washing denim really only delivers one kind of product B blue jeans (or shorts or shirts) with two or three basic shades of blue.

Almost all jeans sold today in America are enzyme washed. The purpose of the enzyme wash is to remove some of the color from the rigid dark blue denim and develop the cast and character of a stonewashed look. Depending upon the length of the enzyme wash cycle, the color of the final denim can range from light blue, medium blue or dark blue jeans with one basic pattern result. The following excerpts taken from a recent article in Daily News Record (AGlut of Basic Denim Has Mills Searching for Fashion Appeal, Mar. 3, 1998) from leaders in the denim industry illustrate the point:

Dutch Leonard, President of Burlington Global Denim, stated ARight now there is a world oversupply of denim in basics. We are shoring up our participation in the added value segment of the denim business@. He further reports that AWe are spending a lot of time with consumers to find out what they want. What we have found is that consumers are looking for something new and different.

Watts Carr, President of Cone Denim North America, indicates "Of course time will tell if consumers are willing to spend more for investment jeans wear, but from what we've heard, the apparel makers are getting into it for the long run. And I think that we will see a broad-based movement that will impact jeans wear manufacturers across the board and help fend off some of the off-shore low-ball-priced business".

Chris Glynn, Executive Vice-President of Greenwood, stated the only way an American mill can survive is in added-value fabrics. The market is big enough for a compromise between volume and innovation.

John Heldrich, President and Chief Executive Officer of Swift Denim, reported that at Magic, there was a lot of excitement around denim. Fashion items are what is doing well. The designer segment is driving lighter weights and finishes, and newer brand names.

John Hudson, Jr., Executive Vice-President of Avondale, indicated that the key to success in today's denim business is low-cost manufacturing and innovation.

Hence, it can be seen that the denim market is crying for new denim products other than the three basic shades of blue. However, the enzyme washing process that is used to create the denim look simply does not have the flexibility to produce a variety of different denim looks. In addition, the enzyme washing process has numerous drawbacks.

The true total cost for enzyme washing one pair of denim jeans is about $3 per pair when all unit cost and freight parameters are considered. The enzyme washing process significantly reduces (by about 36%) tensile and tear properties of the denim. In addition, the enzyme washing process produces numerous defects such as back pocket blowout that results in scrap or rework. The enzyme washing process uses as much as 35 gallons of water per pair of jeans. In addition to all these problems, there are significant environmental problems associated with the handling and disposal of the enzymes and wastewater.

U.S. Pat. No. 5,567,207 assigned to Icon, Inc. discloses a water free method for color fading textile materials with the use of a laser. Icon indicates that the wavelength of the laser should be chosen such that it is strongly absorbed by the dye, but not by the textile material. Icon used a Yag Laser for this purpose. Accordingly, the Icon patent teaches that the Yag laser process will provide optimum dye photo-decomposition while not damaging the textile material. Icon, however, still only taught emulating the standard characteristics of certain convention denim design.

In our copending applications, and U.S. Pat. No. 5,916,461, TechnoLines, LLC. has shown that to produce the desired unique patterns, a $CO_2$ laser is used which alters the surface chemistry of the fabric such that the fabric is indeed damaged, albeit at an acceptable level. For example, TechnoLines, Inc. has determined that the percent reduction in warp tensile strength from a number of different new denim patterns created was from about 10 to about 20%. This is much better than the conventional enzyme washing process which reduces warp tensile properties by about 36%. Therefore, the TechnoLines, LLC laser scribing process clearly but acceptably damages the textile material.

One possible look that has been desired and used by the industry is a seam abrasion look. This look forms a worn or ragged look on all the seams on a pair of jeans.

TechnoLines, LLC. has disclosed in our copending application that a specific range of energy density per unit time, EDPUT, must be controlled such that the various patterns withstand the vigors of repeated washings, yet maintain a bright image pattern.

SUMMARY

The present specification, for the first time, defines formations of new patterns on denim. These new patterns are defined in detail herein, but more specifically include areas of selectively faded areas of denim, and areas of non-selectively faded denim, collectively forming a pattern.

The pattern is a different pattern than that which would be produced by stone wash or acid washes.

One specific group of patterns includes patterns that repeat in a cyclical arrangement, as compared with the stone washed/acid washed look, which is substantially random in nature.

Another totally new group of patterns is a wallpaper type pattern, wherein cells of the pattern repeat in an offset way.

This is preferably done by varying critical operating parameters of the system, including power and speed (EDPUT), and oscillation and frequency.

The inventor recognized two critical needs for a new denim process which can produce: 1) New denim patterns and looks using the current washing process but without enzymes and 2) Existing and new denim patterns with a process that eliminates the current kind of laundry process completely. Another aspect of this disclosure is to form a unique pattern on a textile material, such as denim, using a laser using these controlled parameters. That unique pattern simulates a random look such as the look of a current enzyme washed product. The material is then washed using a conventional washing, without enzymes, but with desizing agents. The washing process can be part of an assembly line. Preferably, the lasing process is done using parameters which alter the surface chemistry of the fabric such that the fabric is indeed damaged, albeit at an acceptable level.

As described above, the icon patent effects a water-free method to fade color. In contrast, this specification describes that some form of washing should be used to eliminate the residue on the denim sheet after laser scribing.

One such process disclosed by this application is the on-line washing process where the denim ribbon is lazed and then passed through feed rollers and a bath to wash and rinse the residue from the denim material.

Alternately, the denim product could be sewn and washed with a desizing agent in a short wash and rinse cycle of about 10 minutes, as compared with the standard 60 plus minute cycle for enzyme washing. TechnoLines, Inc. actually lazed denim jean panels with several new and innovative looks described below and then washed the panels in a conventional non-enzyme wash using a small amount of desizing agent and stones.

The seam abraded look can be obtained by incorporating stones into a commercial washer to achieve this effect. In fact, in one experiment TechnoLines, Inc. completed a lazed pair of denim jeans was washed in a commercial washer with a desizing agent and some stones. Surprisingly, after fifteen minutes, the denim product had a great looking lazed pattern with seam abrasion. In view of the above, the inventor recognized two critical needs for a new denim process which can produce: 1) New denim patterns and looks using the current washing process but without enzymes and 2) Existing and new denim patterns with a process that eliminates the current kind of laundry process completely.

One aspect described in this application is to form a unique pattern with a laser using controlled parameters including energy density per unit time and wobble. That unique pattern simulates the look of a current enzyme washed product. The material is then washed using conventional washing, without enzymes, but with desizing agents. The washing process can be part of an assembly line. Preferably, the lasing process is done using parameters which alter the surface chemistry of the fabric such that the fabric is indeed damaged, albeit at an acceptable level. As described above, the Icon patent effects a water-free method to fade color. In contrast, this specification describes that some form of washing should be used to eliminate the residue on the denim sheet after laser scribing.

One such process disclosed by this application is the on-line washing process where the denim ribbon is lazed and then passed through feed rollers and a bath to wash and rinse the residue from the denim material.

Alternately, the denim product could be sewn and washed with a desizing agent in a short wash and rinse cycle of about 10 minutes, as compared with the standard 60 plus minute cycle for enzyme washing. TechnoLines, Inc. actually lazed denim jean panels with several new and innovative looks described below and then washed the panels in a conventional non-enzyme wash using a small amount of desizing agent and stones.

The seam abraded look can be obtained by incorporating stones into a commercial washer to achieve this effect. In fact, in one experiment TechnoLines, Inc. completed, a lazed pair of denim jeans was washed in a commercial washer with a desizing agent and some stones. Surprisingly, after fifteen minutes, the denim product had a great looking lazed pattern with seam abrasion.

BRIEF DESCRIPTION OF THE DRAWINGS

These and other aspects will be described with reference to the accompanying drawings, wherein.

DESCRIPTION OF THE EMBODIMENTS

In order to impart new patterns on denim, the entire desired surface of the denim is scribed using the laser. The basic layout is described in our copending application Ser. No. 08/550,339, the disclosure of which is hereby incorporated by reference to the extent necessary for better understanding.

Figure 1:
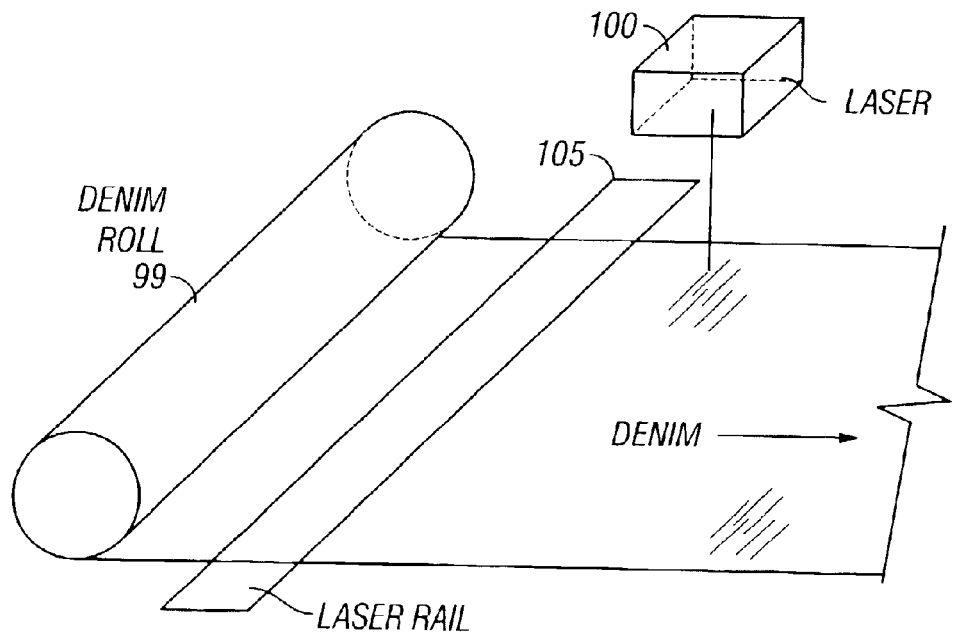
FIG. 1 shows a conveyer system for denim with a laser.
Figure 2:
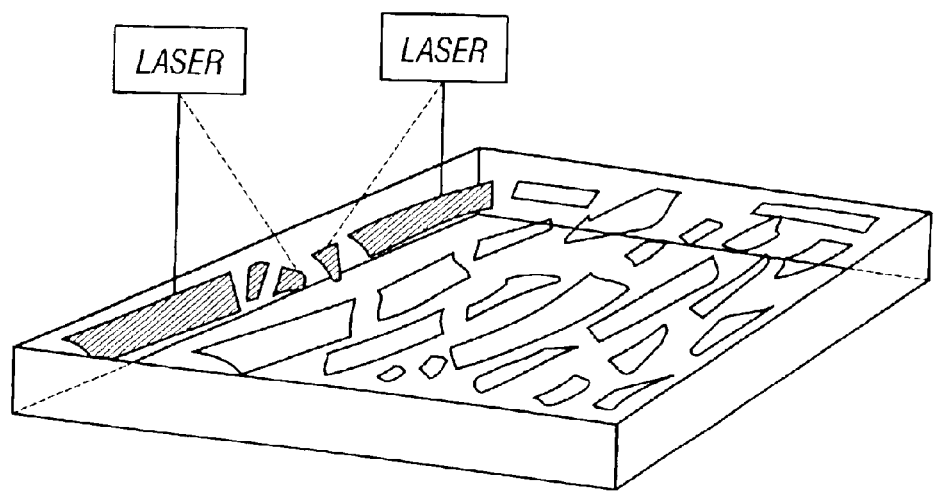
FIG. 2 shows a dual laser system with galvo mirrors that move the laser on the material.

FIG. 1 shows a first embodiment. A roll of denim material 99 is unrolled along a working path, defining a denim "ribbon". The laser 100 is mounted on a rail 105 along the width of the denim ribbon 99. The laser forms desired patterns in the material by traversing a path along the width of the denim ribbon 99 and applying a controlled energy density per unit time ("EDPUT") which intentionally damages the surface of the material in a way that changes the look of the material.

This operation is repeated in a continuous fashion to continuously change the look of the denim material.

A first embodiment scribes a periodic pattern on the material to form a totally new pattern on denim material. One or multiple lasers are mounted on the rails. If multiple lasers are used, the width of the ribbon 99 for each laser to scribe a specific section of the width or the total width per one traverse of the laser.

Figure 3:
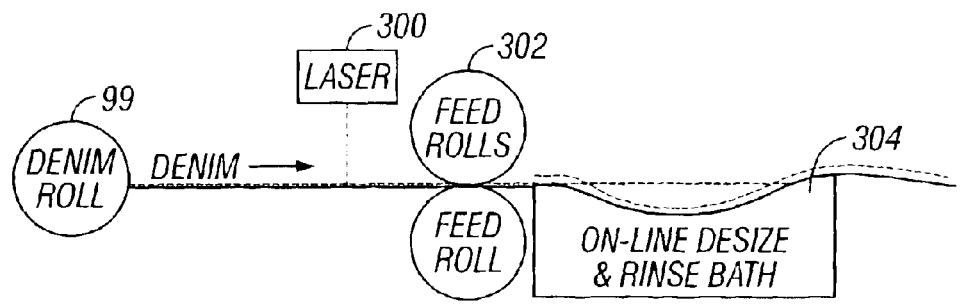
FIG. 3 shows denim with feed rolls and an on-line washing system.
Figure 4:
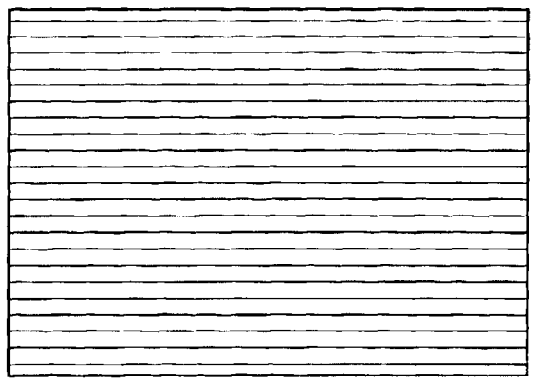
FIGS. 4 and 5 show laser lines scribed on denim.

FIG. 3 shows that the laser can also be mounted over the cutting table and one or more lasers can scribe the patterns on the various denim panels. In this case, the scribing movement is via the galvanometric mirrors in the laser. Of course, the galvometric mirrors could also be used in the first example to scribe a pattern on denim in a continuous fashion as the denim is rolled from the roll at the textile mill as shown in FIG. 4.

Figure 5:
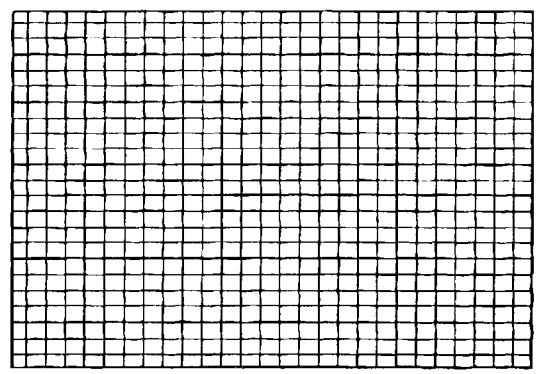

Even though the material has been changed in look, removal of the desizing agent may still be desireable. In order to allow this operation without a separate washing operation, the laser-scribed product can then be be washed in a mild desizing agent as part of the processing. FIG. 5 shows this being washed as part of the on-line processing.

Turning now to the more specific, a number of specific new designs have been made using this technique. This has produced totally new looks which have never before been possible. Each of these new looks has been made by carefully controlling a wide variety of laser operating parameters including frequency, oscillation, power, speed, and focal distance.

The parameters of the laser are controlled to make these designs. These parameters include:

Frequency, which controls the pulse duty cycle of the laser. A lower frequency lowers the number of pulses per unit time. The frequency of 999 is close to continuous wave ("cw"). The Q switch on the laser determines the amount of frequency that is emitted.

Power controls the percentage of power that is emitted by the laser, compared with the pump source's maximum output power.

Speed is the rate at which the beam travels across the lasing medium.

Beam spot is the size of the laser beam that is emitted.

Image density is the proximity of fill lines; usually a linear placement that determines the contiguousness of the image.

Note that speed and frequency determine the size of the heat affected zone ("HAZ"), which in turn determines the marking line width. Increasing the line width, by slow speed and/or high frequency, decreases the image density but increase the surface temperature. This increases the thermal breakdown of the material.

Wobble is the shaking motion of the galvo mirrors in the laser. This creates a movement from the center point in units of 0–3 mm. Two parameters control wobble: the waveform that defines the geometry of the trace (sine, square), and amplitude.

The designs described herein were formed with a laser from Excel, Stylus model. As measured, the speed" parameter is approximately in inches per second (a speed of 30 marked 12 inches in a second). Wobble defines the amount of oscillation of the laser. A 0.02 wobble produces an oscillation of about 1 mm, which repeats differently depending on the speed. At a speed of 30, the wobble repeats every 3.7 mm. At a speed of 40, the wobbling repeats every 6.5 mm. A wobble value of 0.04 produces an oscillation of about 2 mm, which, at speed 30, repeats approximately every 4.1 mm approximately.

Several striking exemplary denim designs were produced as shown in FIGS. 6–20. These designs are completely new within the field of denim design.

Figure 6:
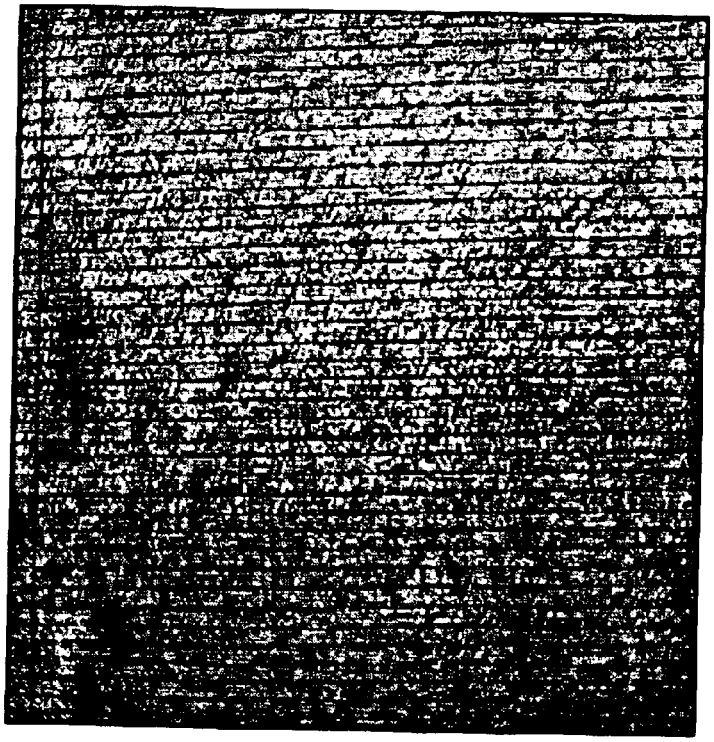
FIG. 6 shows seam abrasion on denim.

FIG. 6 shows a unique design of vertical stripes called "Stroller Stripe". This is formed of a number of stripes where the denim has been lightened by the laser. Within each stripe is a filled in portion which is not completely filled in, but is shaded by wobble of the laser. This wobble shades by forming a pattern of offset spirals in between the outer edges defining the stripe edges.

Figure 7:
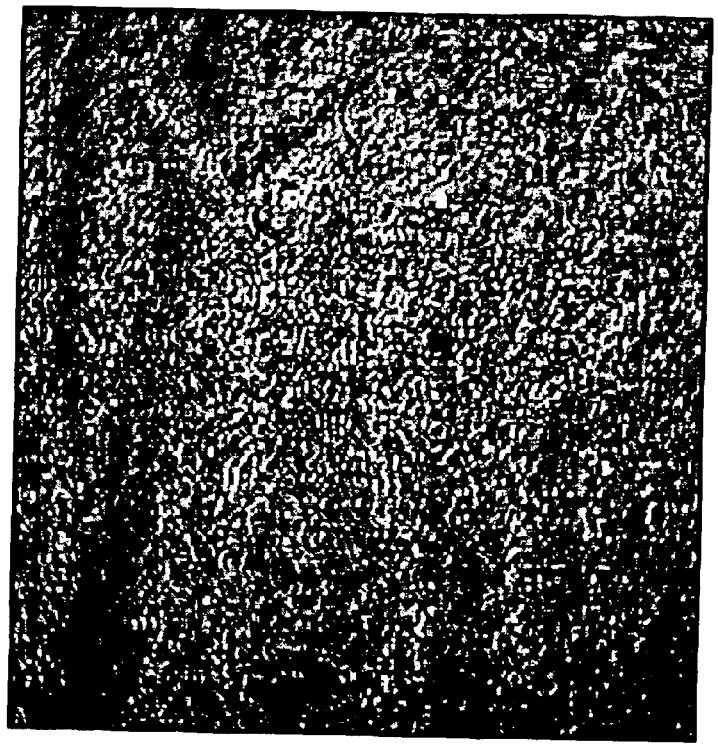
FIGS. 7–20 shows specific patterns that were made using the present system.

FIG. 7 shows a spotted pattern called "Broken Birdseye". This includes a pattern that is randomly spotted with lightened areas.

Figure 8:
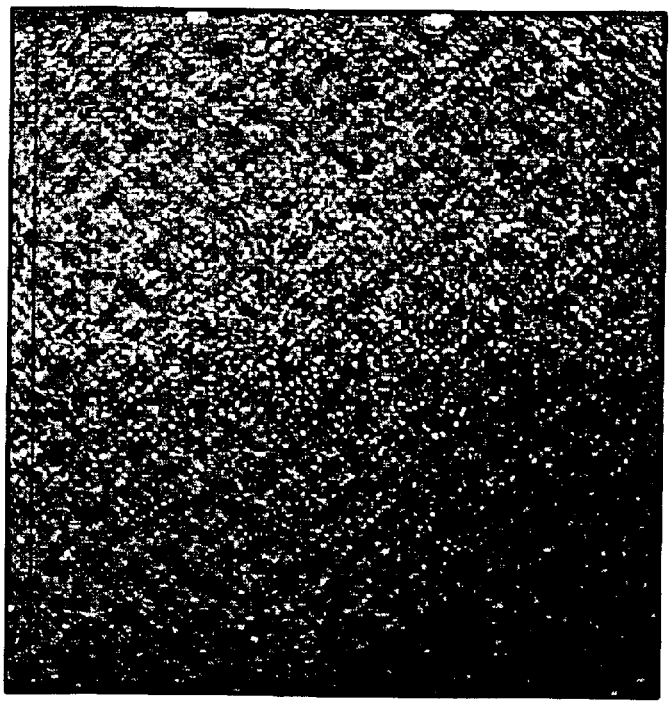

FIG. 8 shows a boxed pattern called "Honeycomb". This is a repeating pattern of honeycomb-surrounded shapes, with lightened spots in each honeycomb cell.

Figure 9:
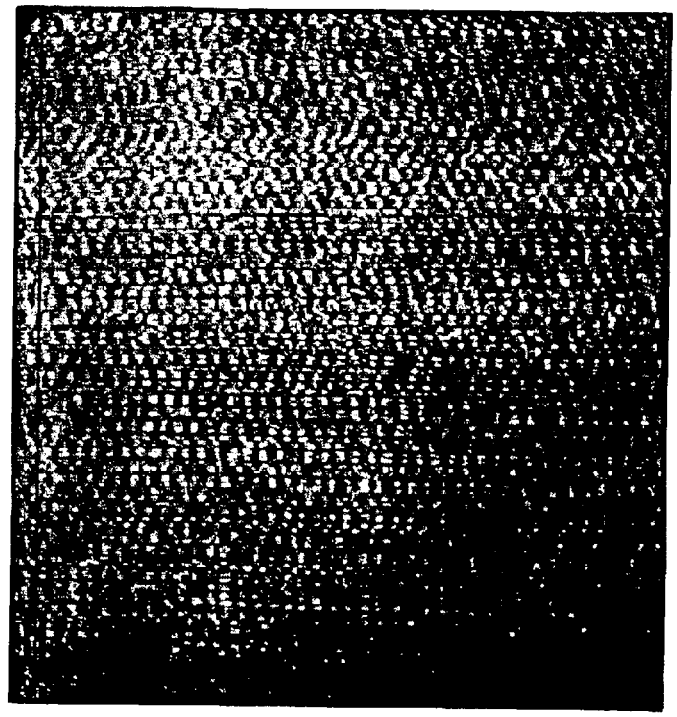
Figure 10:
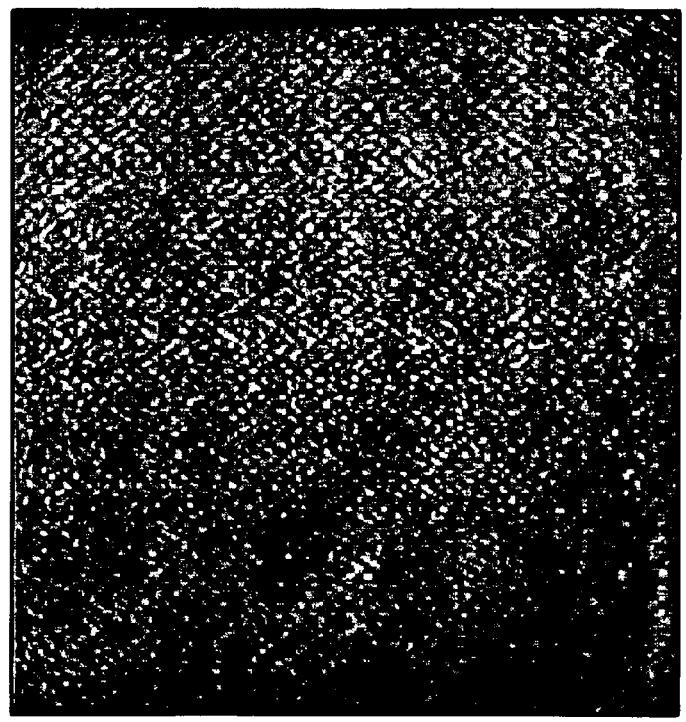

FIG. 9 shows a wallpaper type pattern called "Sand Crepe". This has pattern cells which repeat on the material, but are offset relative to one another. Each of the generally trapezoidal shapes is in a specified pattern. FIG. 10 shows a "Zig Zag" pattern where the overall pattern forms a zig zag. The material is lightened in areas between the darkened zig zag pattern outline. The lightened portion is preferably filled in by a spiral pattern.

Figure 11:
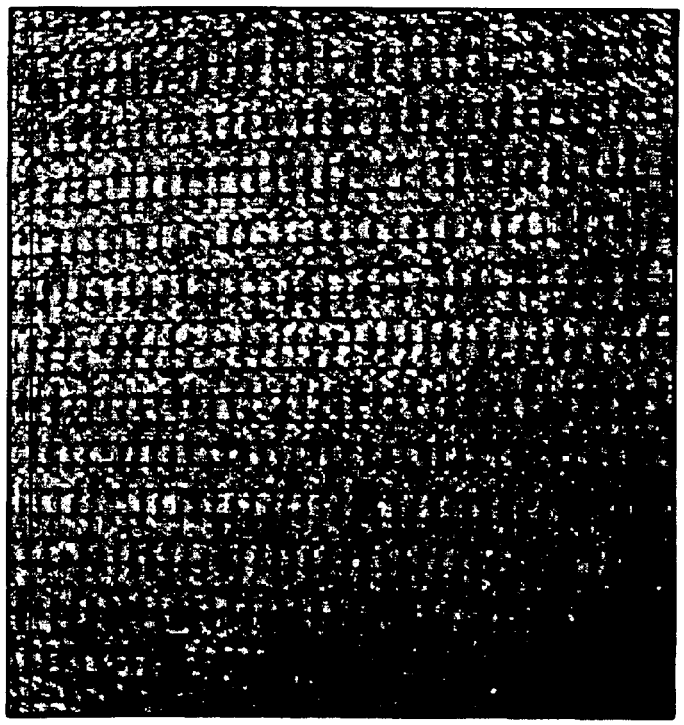

FIG. 11 shows a "Vertical Ladder" pattern. The areas between cells remains dark, and the center of the cells is filled.

Figure 12:
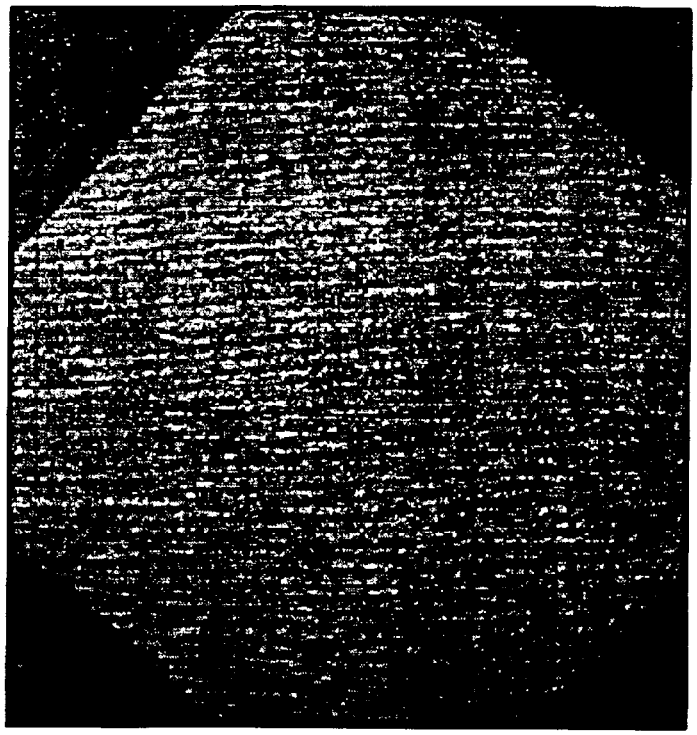

FIG. 12 shows a "Tuxedo Look" pattern with light stripes of material.

Figure 13:
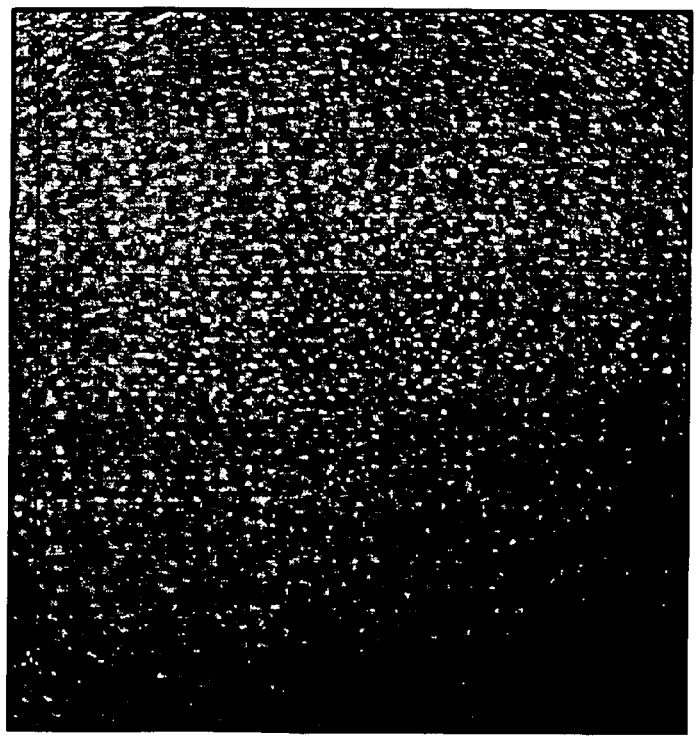

FIG. 13 shows a "Twisted Fiber" pattern that includes alternate light and dark areas.

Figure 14:
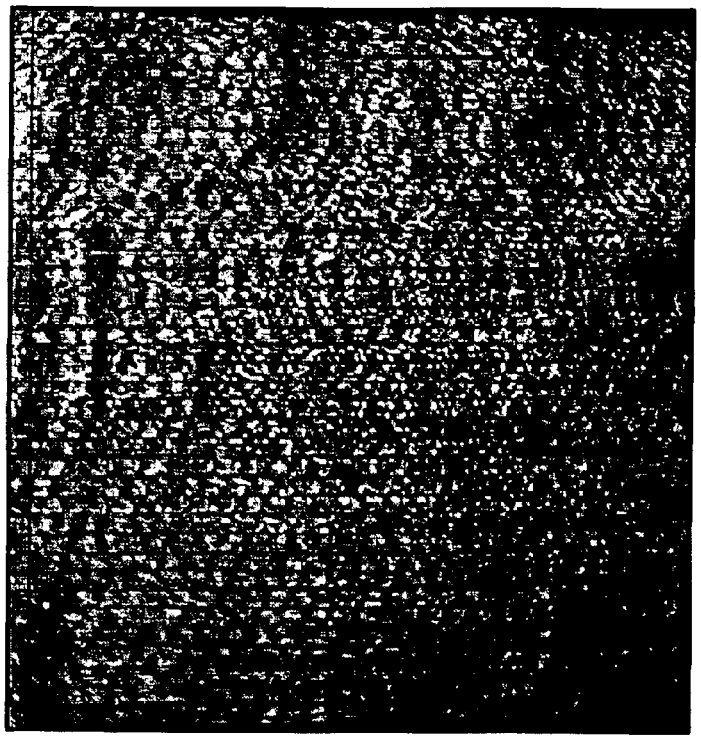

FIG. 14 shows an "Angled Ladder" pattern with polygonal shapes, each of which is defined by internal cycloided pattern parts.

Figure 15:
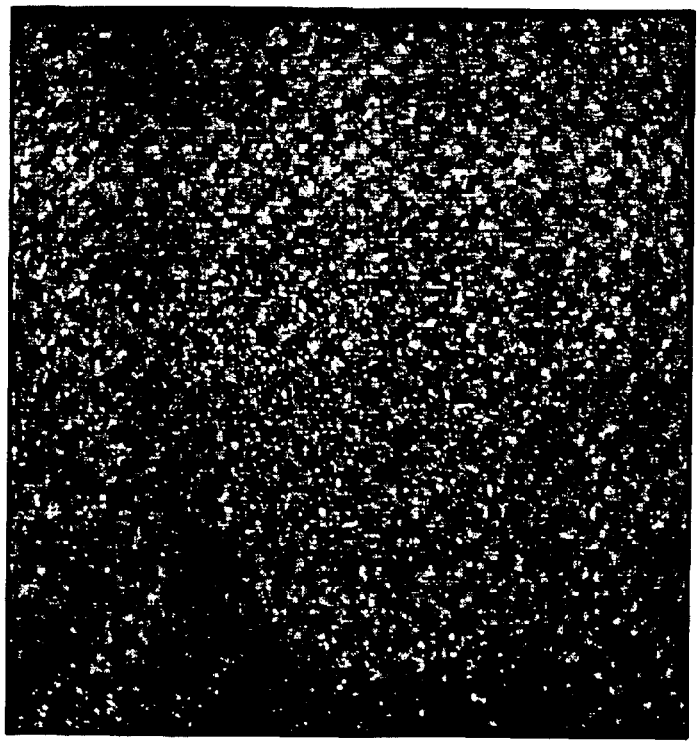

FIG. 15 shows a "Diamond" pattern with alternate light and dark areas, each area being substantially sinusoidal in shape.

Figure 16:
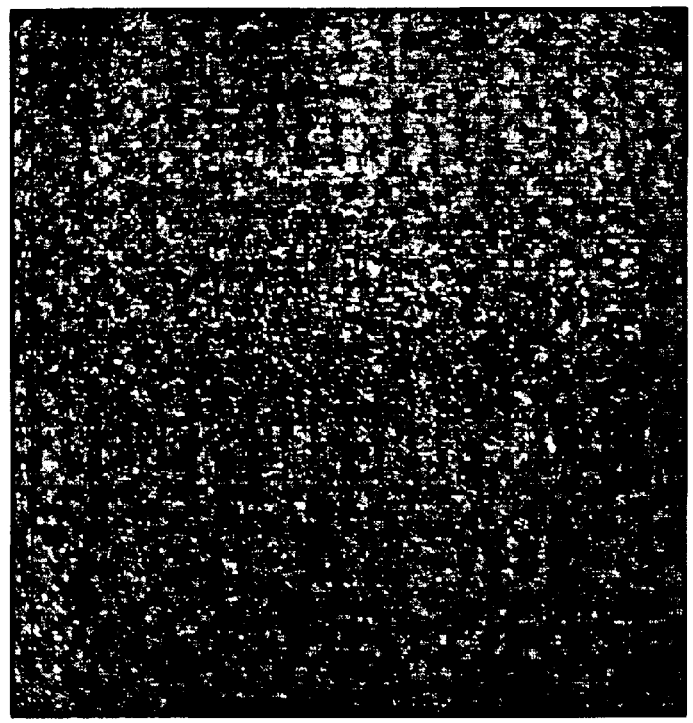

FIG. 16 shows a "snakeskin" pattern where each pattern part is a square outlined in darker portion, the interior of which is defined by a non-filled shape.

Figure 17:
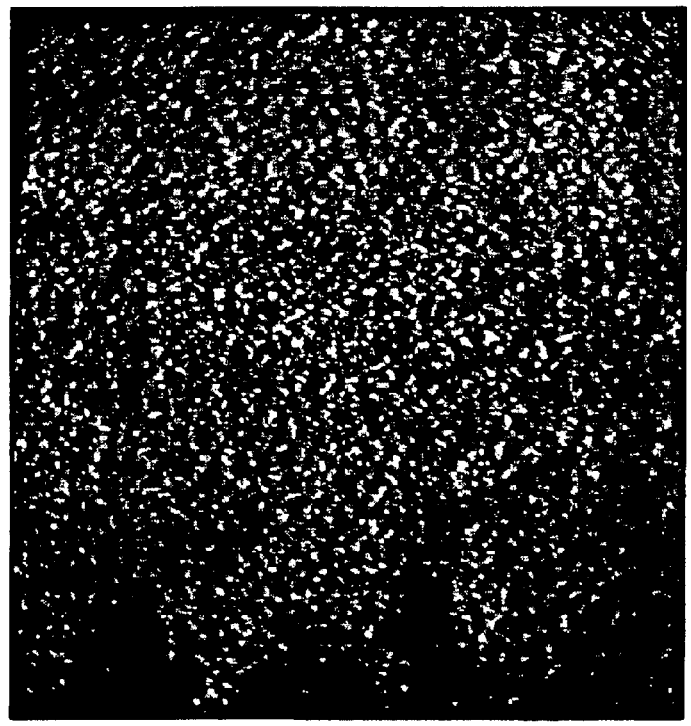

FIG. 17 shows a "Ruff Hewn Look" pattern with darker dividing areas seperating lighter interior portions.

Figure 18:
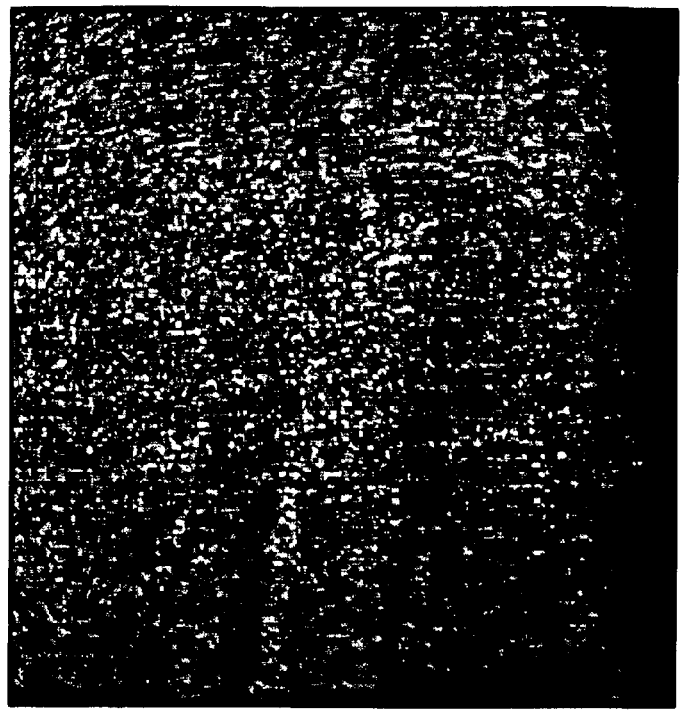

FIG. 18 shows a "Shotgun Blast" pattern which is speckled.

Figure 19:

FIG. 19 shows a "High Ridged Look" pattern, also speckled.

Figure 20:
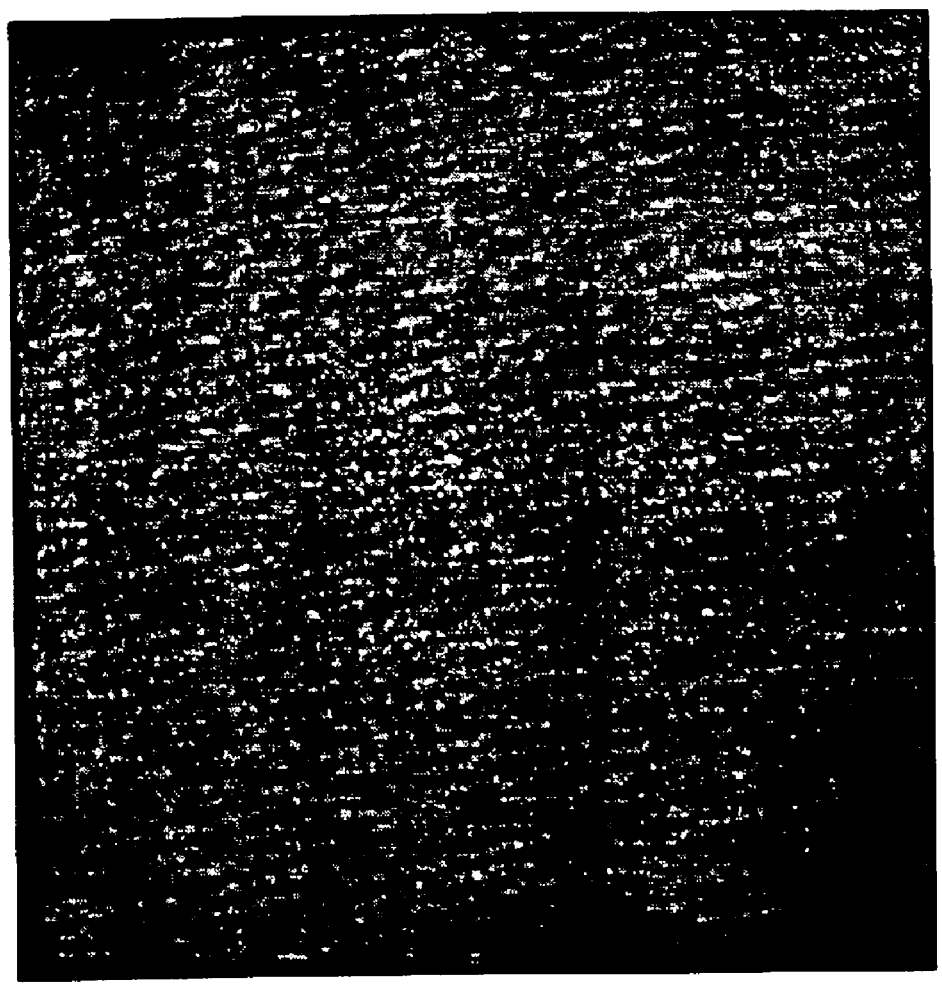

FIG. 20 shows a "Ribbed Look" pattern which has lighter and darker spots arranged in ribs.

In all of these patterns, there are light spots on the denim caused by the laser damaging the material and giving it a lighter look. These light spots are interspersed with darker areas where either the laser has not altered the original color of the material, or has less altered the original color thereby leaving the material darker in those areas.

Totally new looks include repeating patterns, repeating polygonal/square patterns, pattern areas that are filled with "wobbled" patterns, that is those that repeat in an offset sinusoidal or cycloid shape to form alternately light and dark areas, and others.

The specific laser operating parameters which resulted in the production of these novel denim looks is given in Table 1.

TABLE I

Laser Operating Parameters for the Production of Unique Denim Designs

| Denim Pattern | Power (Watts) | Speed (in/sec) | Frequency | Wobble (in) | Pattern Density (%) | Miscellaneous |
|---|---|---|---|---|---|---|
| Stroller Stripe | 69 | 6 | .009 | .02 | 50 | |
| Broken Birdseye | 99 | 20 | | | 70 | TechnoBlast pattern |
| Honeycomb | 69 | 45 | .009 | | 100 | Double Pass |
| SandCrepe | 59 | 20 | .015 | .02 | 100 | |
| ZigZag | 69 | 30 | .009 | | 100 | Double Pass |
| Vertical Ladder | 69 | 10 | .009 | .02 | 50 | |
| Tuxedo | 99 | 20 | | | 75 | 45 degree orientation |
| Twisted Fiber | 59 | 10 | .009 | .02 | 35 | |
| Angled Ladder | 69 | 14 | .009 | .02 | 50 | |
| Diamond | 59 | 29 | .015 | .02 | 100 | |
| Snakeskin | 69 | 25 | .009 | | 100 | |
| Ruff Hewn | 99 | 16 | | .02 | 33 | TechnoBlast pattern |
| Shotgun Blast | 59 | 7 | .009 | .02 | 35 | TechnoBlast Pattern |
| High Ridged Look | 99 | 23 | | .02 | 75 | |
| Ribbed | 99 | 26 | | | 75 | 45 degree orientation |

As can be seen from the above chart, the characteristics of the patterns include power between around 60–100 watts, speed of about 6–50 inches per second, frequency between 0.009 and 0.015, wobble of either 0 or 0.02, and pattern density between 33 and 100.

Significantly, the tensile and tear properties of the denim following laser scribing and conventional washing is markedly superior to that of the denim following normal enzyme washing. Table II shows the improvement in physical properties associated with the laser scribing process and conventional washing process vs. the normal enzyme washing process. The conventional enzyme washing process for denim reduces warp tensile properties by about 36% whereas the laser scribing process to produce new denim patterns followed by conventional home washing reduces the tensile tear properties anywhere from about 10 to about 20% (for all but one of the patterns in which a heavy laser scribe reduced warp tensile properties by 29%).

TABLE II

Tensile Properties of New Denim Products Made from TechnoLines, Inc. Laser Scribing Process and Washed in a Conventional Home Washing Machine vs. Traditional Dean Products Enzyme Washed.

| Product | Warp Tensile (lbs) | Percent Loss |
| --- | --- | --- |
| Rigid 14.75 oz Denim | 193 | |
| Enzyme Washed Denim | 123 | 36.3 |
| Broken Birdseye (Light Laser Scribe) | 174 | 9.8 |
| Broken Birdseye (Medium Laser Scribe) | 161 | 16.6 |
| Broken Birdseye (Heavy Laser Scribe) | 137 | 29.0 |
| SandCrepe (Light Laser Scribe) | 159 | 17.6 |
| Sand Crepe (Medium Laser Scribe) | 154 | 20.2 |
| Sand Crepe (Heavy Laser Scribe) | 153 | 20.7 |
| Honeycomb (Light Laser Scribe) | 168 | 12.9 |
| Honeycomb (Medium Laser Scribe) | 168 | 12.9 |
| Honeycomb (Heavy Laser Scribe) | 158 | 18.1 |

Although only a few embodiments have been described in detail above, those of skill in the art recognize that many modifications are intended and predictable from the disclosed embodiments. For example, other patterns are possible by suitable variations in the parameters as described herein. These patterns, however, broadly fall into two categories: a pattern formed by a cyclical process which appears to have random parts, and a pattern formed by the cyclical process which has repeating parts.

While the process described herein contemplates denim as being the preferred material, it should be understood that any fabric or material could be used.

All such modifications are intended to be encompassed within the following claims.

What is claimed is:

1. A method, comprising:
    setting specified parameters on a controllable laser, said specified parameters being parameters which control an amount of energy that is applied to a denim workpiece to alter a surface chemistry of the denim in a way to change the look of the denim according to a pattern without undesirably damaging the denim; and
    using said controllable laser to modify the look of an entire width of a denim article per single traverse of the laser as the output of the laser passes across the denim article.

2. A method as in claim 1, wherein the denim article is an item of denim apparel.

3. A method as in claim 1, wherein the denim article is a roll of denim a material that is unrolled to form a denim ribbon.

4. A method as in claim 1, wherein the specified parameters include an image density of lines that are formed on the denim.

5. A method as in claim 1, wherein the specified parameters control geometry of the output of the laser.

6. A method as in claim 1, wherein said using comprises using said laser along a conveyer and further comprising washing the denim along said conveyor after said using.

7. A system comprising:
    a material holding part, which holds a workpiece to be processed;
    a controllable laser, which is controllable according to specified parameters which control power output and position of the laser to alter a surface chemistry of the workpiece where an entire width of the workpiece is altered per single traverse of the laser.

8. A system as in claim 7, wherein the workpiece is a denim apparel article.

9. A system as in claim 7, wherein the workpiece is a roll of denim material.

10. A system as in claim 9, further comprising a conveyor system, and wherein the roll of denim material is unrolled along said conveyor system.

11. A system as in claim 10, further comprising a washing station along the conveyor system.

12. A system as in claim 7, wherein the specified parameters control a line width of marking by the laser material.

13. A method, comprising:
    setting specified parameters on a controllable laser, said specified parameters including an energy density per-unit time that marks a denim material without undesirably damaging the denim material, wherein said marking comprises changing a look of the denim material in a way which can be seen by a user, and wherein said specified parameters comprise parameters which causes a pattern to be formed on said denim which pattern repeats across an entire unit area of said denim; and
    using the controllable laser to modify the look of the denim according to said specified parameters to form a plurality of unit area patterns on the denim.

14. A method as in claim 13, wherein the denim material is a denim apparel.

15. A method as in claim 13, wherein the denim material is a roll of denim material that is unrolled during said using.

16. A method as in claim 15, further comprising using the controllable laser along a conveyor system.

17. A method as in claim 16, further comprising washing the denim material along the conveyor.

* * * * *